US009235824B2

(12) United States Patent
Martin et al.

(10) Patent No.: US 9,235,824 B2
(45) Date of Patent: Jan. 12, 2016

(54) CORD AND CABLE IDENTIFICATION AND TRACKING SYSTEM

(71) Applicants: William Bernard Martin, Franklin, TN (US); Kris Andres Martin, Franklin, TN (US); Alyssa Martin Kennedy, Franklin, TN (US); Michael Graham Martin, Nashville, TN (US)

(72) Inventors: William Bernard Martin, Franklin, TN (US); Kris Andres Martin, Franklin, TN (US); Alyssa Martin Kennedy, Franklin, TN (US); Michael Graham Martin, Nashville, TN (US)

( * ) Notice: Subject to any disclaimer, the term of this patent is extended or adjusted under 35 U.S.C. 154(b) by 0 days.

(21) Appl. No.: 14/206,564

(22) Filed: Mar. 12, 2014

(65) Prior Publication Data

US 2014/0263610 A1    Sep. 18, 2014

Related U.S. Application Data

(60) Provisional application No. 61/790,610, filed on Mar. 15, 2013.

(51) Int. Cl.
G06F 19/00 (2011.01)
G06Q 10/08 (2012.01)

(52) U.S. Cl.
CPC .................. *G06Q 10/087* (2013.01)

(58) Field of Classification Search
CPC .................................................. G06Q 10/087
USPC .......................................... 235/385, 462.09
See application file for complete search history.

(56) References Cited

U.S. PATENT DOCUMENTS

| 6,076,859 | A  | * | 6/2000 | Hall et al. ..................... 283/89 |
| 6,573,832 | B1 |   | 6/2003 | Fugere-Ramirez |
| 7,909,239 | B2 | * | 3/2011 | Grant et al. ................... 235/375 |
| 8,505,821 | B2 | * | 8/2013 | Medina et al. ............... 235/454 |
| 2008/0048862 | A1 |   | 2/2008 | Kritt et al. |
| 2009/0166416 | A1 | * | 7/2009 | Fleming ........................ 235/385 |
| 2011/0153614 | A1 | * | 6/2011 | Solomon ....................... 707/740 |
| 2011/0281346 | A1 | * | 11/2011 | Halpern et al. ............. 435/307.1 |
| 2012/0037700 | A1 | * | 2/2012 | Walji et al. .................... 235/385 |
| 2012/0158482 | A1 | * | 6/2012 | Paradise et al. ............ 705/14.25 |

OTHER PUBLICATIONS

Van Der Weyden, "QR code stickers will help locate missing items" (online) Nov. 12, 2012.
Bea, "Belon.gs will use QR codes and good deeds to get your lost items found" (online) Jul. 6, 2012.

* cited by examiner

*Primary Examiner* — Seung Lee
(74) *Attorney, Agent, or Firm* — Wayne Edward Ramage; Baker Donelson (57) ABSTRACT

A system for identifying and tracking components, including but not limited to cords, cables and connectors, that are associated with an electronic device or apparatus or that are part of a "set." Devices include TVs, DVD players, VCRs, DVRs, computers, printers, camera, and the like. A plurality of self-adhesive stickers marked with a scannable code, each with a unique code in that set, are affixed to a device and its accessories. The codes are scanned by a mobile computing device for entry into the system. Subsequent identification of a particular accessory can be performed by using the system to scan the coded sticker on that accessory.

13 Claims, 8 Drawing Sheets

CORD AND CABLE IDENTIFICATION AND TRACKING SYSTEM

This application claims benefit of and priority to U.S. Provisional Application No. 61/790,610, filed Mar. 15, 2013, by William Martin, et al., and is entitled to that filing date for priority. The specification, figures and complete disclosure of U.S. Provisional Application No. 61/790,610 are incorporated herein by specific reference for all purposes.

FIELD OF INVENTION

This invention relates to a system and method for identifying, sorting, tracking and organizing electrical and power cords, connectors, and cables.

BACKGROUND OF THE INVENTION

Many people now have a plurality of electronic devices of various sorts. In many cases, the power cords, cables, and connectors (hereinafter collectively referred to as "cords") for each device are different. Often, the user will place all such cords in a basket, box, or drawer so they do not become lost. However, over time these accumulate and it becomes practically impossible to identify or match a particular cord with its device. The device in question may no longer be in use or have been discarded, but the owner is reluctant to discard any cord because he or she is unsure if it no longer needed. And when a particular cord is needed, it becomes a time-consuming, frustrating challenge to locate the right cord.

SUMMARY OF THE INVENTION

In various exemplary embodiments, the present invention comprises a network or cloud-based system for identifying and tracking components, including but not limited to cords, cables and connectors, that are associated with an electronic device or apparatus or that are part of a "set." For example, a DVD player would have a power cord, several connecting cords, and a remote control.

In one embodiment, the invention comprises a plurality of self-adhesive stickers marked with a scannable code, each with a unique code in that set. The code can be any sort of coding means known in the art, including but not limited to bar codes and QR codes. The stickers can be sold in packs at retail or online. In one embodiment, twenty stickers is sold as a set, each sticker with a unique code in that set.

The stickers may be placed on flat surfaces or can wrap around cords or plugs. In one embodiment, the stickers may wrap around a cord or plug and adhere to themselves.

The user downloads or installs an application program on a smart phone, tablet computer, or other mobile device. The application program also may be used on a computer with a scanner or scanning device in electronic communication therewith. With the application program, the user then uses the camera or scanner in the mobile device to scan the stickers, and record data that identifies each component in the "set." The application prompts the user to create a profile, which comprises, in one embodiment, an email address and password.

When the user scans a sticker and inputs data, that information may be stored locally (e.g., on the mobile device or computing device), but also may be stored on a remote system server. This ensures that the information will always be available to the user, regardless of which device is being used to connect to the service. The distinctive combination of user profile and sticker code allows sticker codes to be duplicated among sets. In one embodiment, for example, a particular series or set of stickers may have the same 20 codes within that series or set (where each series or set is sold separately). In alternative embodiments, another number of unique codes may be provided in each series or set.

In one embodiment, the user starts the process by placing a sticker on each component in the associated set, touching "scan" on his or her mobile device within the application, and then scanning the main device to create a master record for that set. The user then scans each component within the set to add that data to the master record for each device. The data is editable, and there are fields to record serial numbers, date of purchase, place of purchase, warranty information, locations, and other information.

To determine the origin and use for any random cord or component with a sticker, the user activates the application, then touches "ID" or "Identify" or "Scan" or similarly-marked button, and scans the code on the sticker. The application then examines the data files and identifies the main device and all components with which the component or cord is associated.

DETAILED DESCRIPTION OF EXEMPLARY EMBODIMENTS

In various exemplary embodiments, the present invention comprises a network or cloud-based system for identifying and tracking components, including but not limited to cords, cables and connectors, that are associated with an electronic device or apparatus or that are part of a "set." For example, a DVD player would have a power cord, several connecting cords, and a remote control. Similar devices are TVs, DVRs, computers, printers, camera, and the like.

Figure 1:
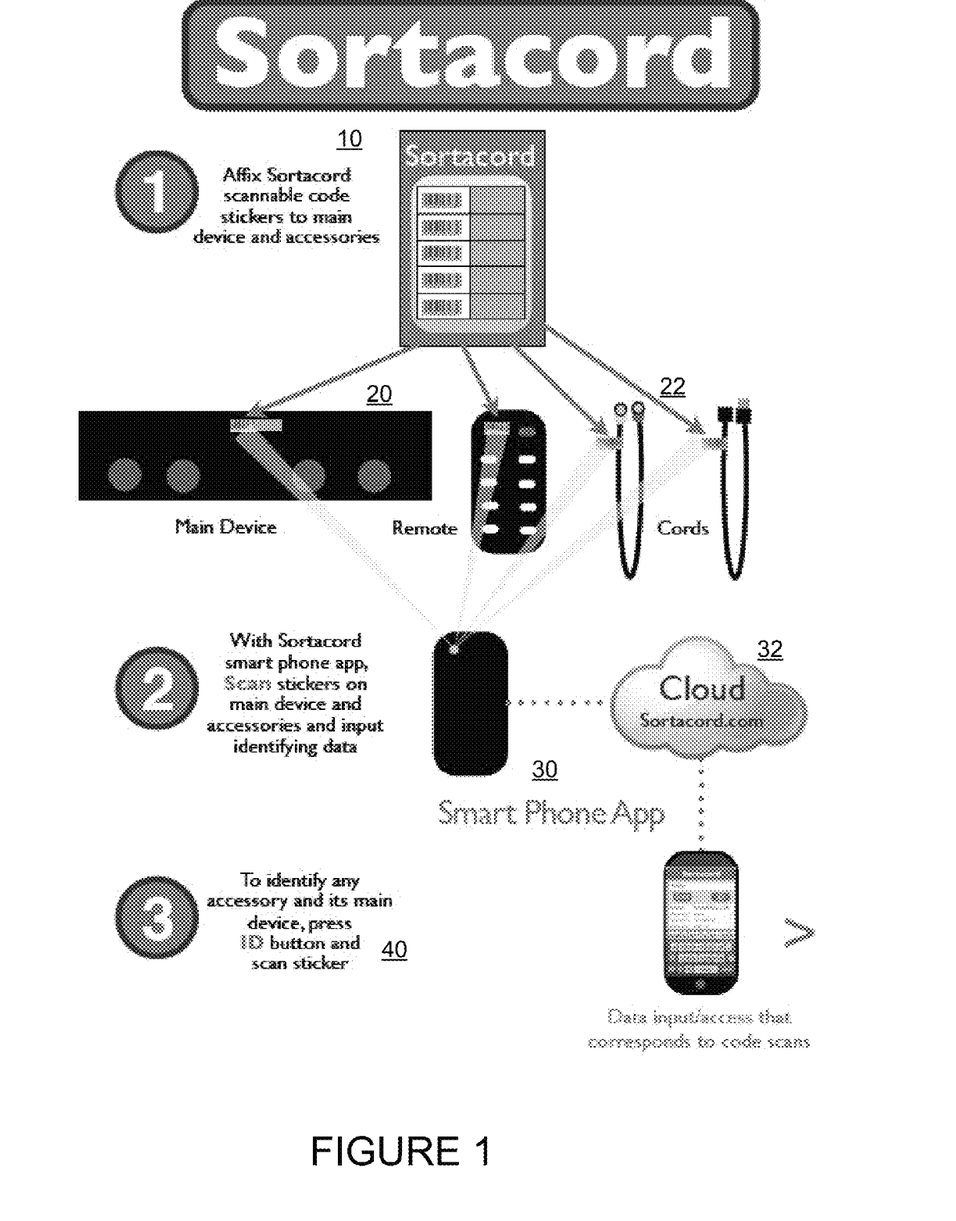
FIG. 1 shows a diagram of a system in accordance with an embodiment of the present invention.
Figure 2:
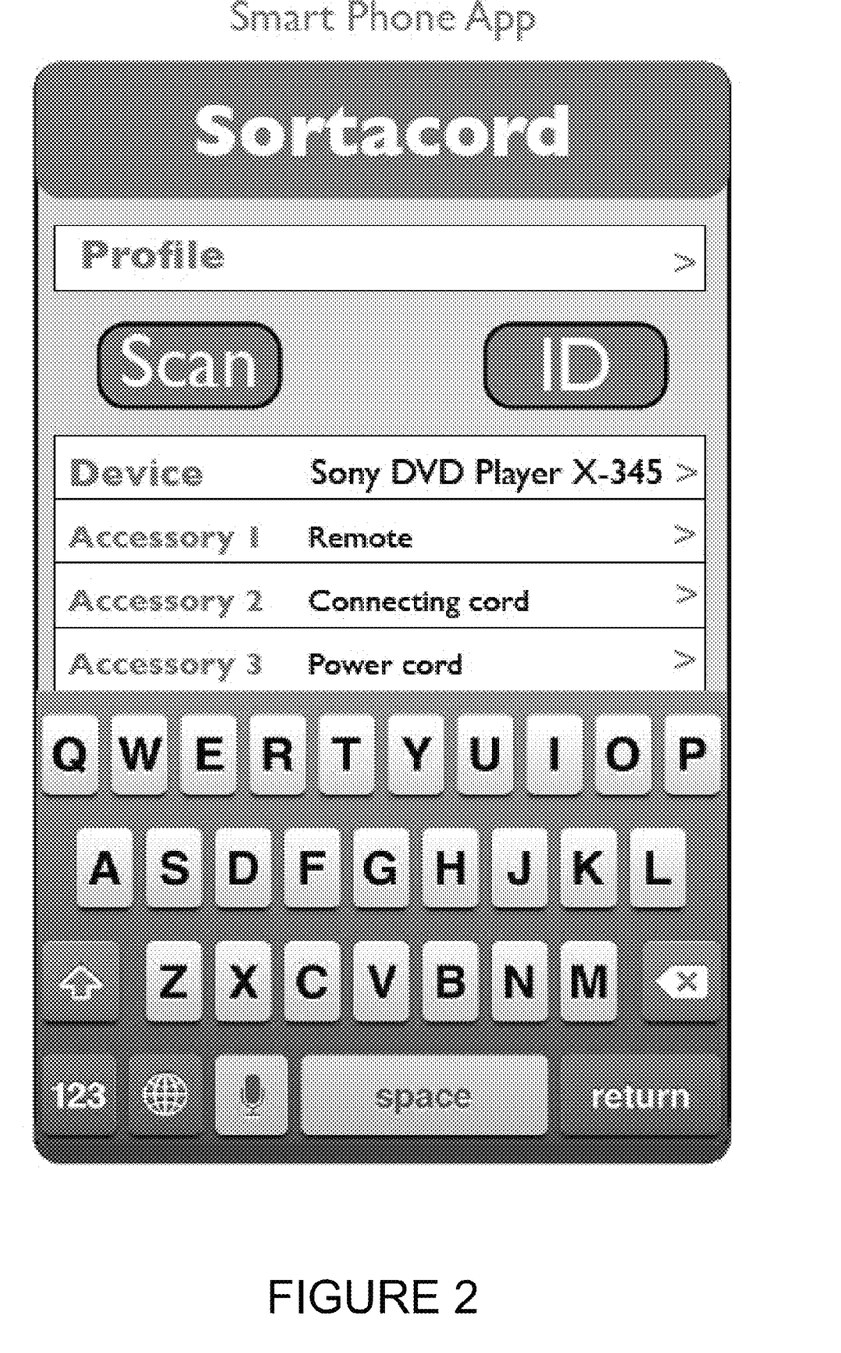
FIG. 2 shows an application program of the system of FIG. 1 in operation on a mobile device.
Figure 4:
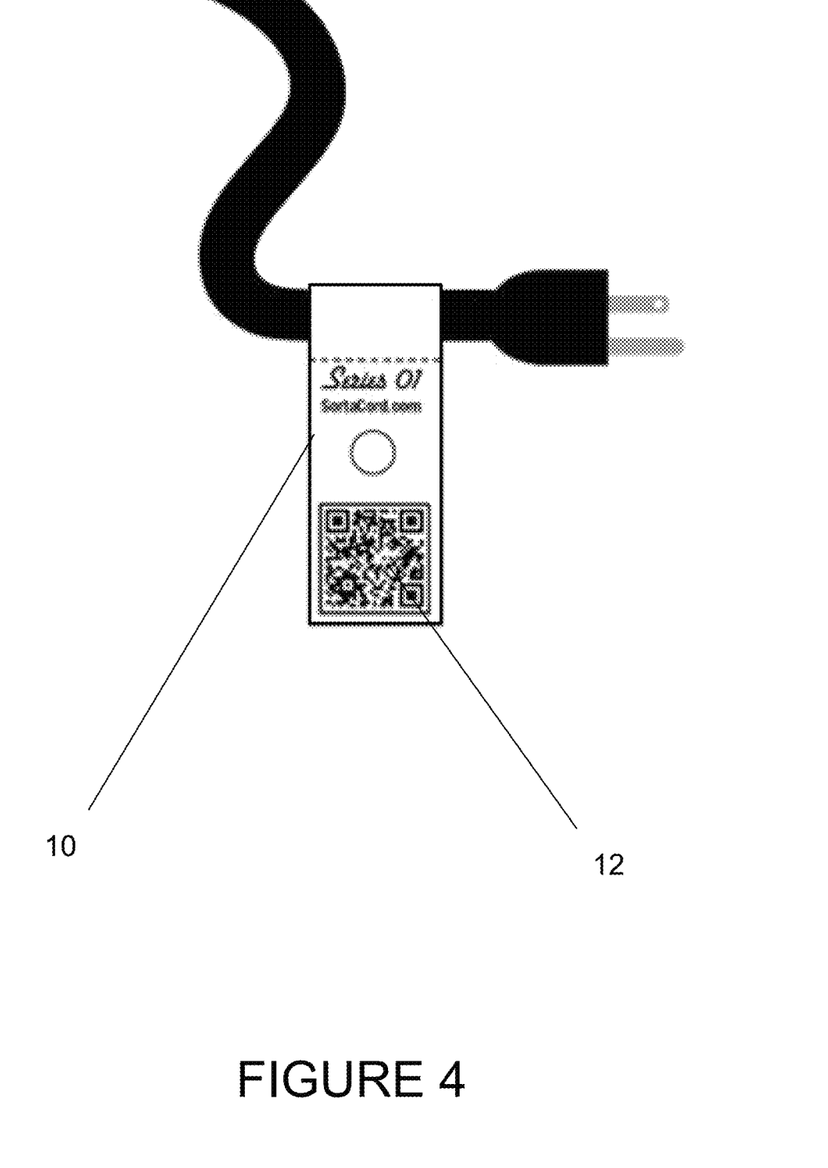
FIG. 4 shows an example of a coded sticker.

In one embodiment, as seen in FIGS. 1 and 2, the invention comprises a plurality of self-adhesive stickers 10 marked with a scannable code 12, each with a unique code in that set. The code can be any sort of coding means known in the art, including but not limited to bar codes and QR codes 12 (as seen in FIG. 4). The stickers can be sold in packs at retail or online. In one embodiment, twenty stickers is sold as a set, each sticker with a unique code in that set. The stickers may be pre-cut in a variety of sizes, so that they may simply be peeled off and used. In another embodiment, some or all of the stickers may be provided with dotted or dashed lines, so that the user may cut stickers of the desired shape or size.

The stickers may be placed on flat surfaces 20 (such as the electric device or remote control), or can be wrapped around cords or plugs 22. In one embodiment, the stickers may wrap around a cord or plug and adhere to themselves.

The user downloads or installs an application program 30 on a smart phone, tablet computer, or other mobile device. The application program also may be used on a computer with a scanner or scanning device in electronic communication therewith. With the application program, the user then uses the camera or scanner in the mobile device to scan the code on the stickers, and records data that identifies each component in the "set." The application prompts the user to create a profile, which comprises, in one embodiment, an email address and password.

In one embodiment, the user scans the coded sticker on the first device, inputs its named and optional identifying data, including a photo taken with the mobile device, to create a device record. Touching the "Save" icon causes the record to be saved, and the user may then proceed to repeat the process for accessories for that device. In the embodiment shown, the user can swipe the device record screen to the left, and touch the edit icon (shown as a pencil in this embodiment). The users touches "Add Accessory," scans the code on the accessory, inputs the data, and then saves the information. This process is repeated for each accessory.

When the user scans a sticker and inputs data, that information may be stored locally (e.g., on the mobile device or computing device), but also may be stored on a remote system server (i.e., on the "cloud") 32. This ensures that the information will always be available to the user, regardless of which device is being used to connect to the service. The distinctive combination of user profile and sticker code allows sticker codes to be duplicated among sets. In one embodiment, for example, a particular series or set of stickers may have the same twenty codes within that series or set (where each series or set is sold separately). In alternative embodiments, another number of unique codes may be provided in each series or set.

In one embodiment, the user starts the process by placing a sticker on each component in the associated set, touching "scan" on his or her mobile device within the application, and then scanning the main device to create a master record for that set. The user then scans each component within the set to add that data to the master record for each device. The data is editable, and as seen in FIG. 2, there are fields to record device information and serial numbers, number of accessories (e.g., remotes, connecting cords, power cords), date of purchase, place of purchase, warranty information, locations, and other information. The user can also record warranty info, receipts, serial and model numbers, and other valuable data.

To determine the origin and use for any random cord or component with a sticker, the user activates the application, then touches "ID" or "Identify" or "Scan" or similarly-marked button and scans the code on the sticker 40. The application then examines the data files and identifies the main device and all components with which the component or cord is associated.

Figure 3:
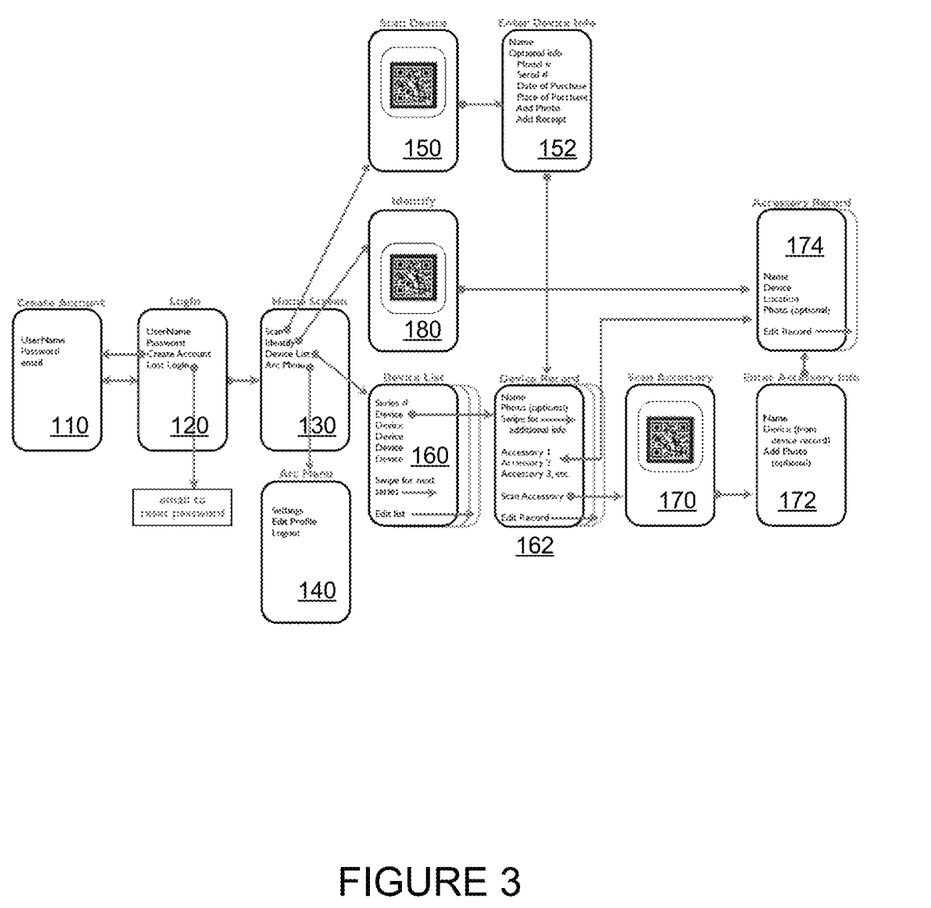
FIG. 3 shows a diagram of another system in accordance with an alternative embodiment of the present invention.

FIG. 3 shows an alternative embodiment of a mobile application of the present invention. Initially, the user creates an account 110, which includes identifying information such as user name, password, email, and other contact information. Thereafter, the user then log ins to his or her account through the login screen 120. The user can have his or her password reset if lost or forgotten. Upon login, the users is presented with the home screen 130. The home screen presents a variety of options, including scanning a device and accessories (to add to the system), identifying a device or accessory already in the system, reviewing and managing the device and accessory list, or managing the account 140 (e.g., settings, editing the profile, and the like).

Figure 5:
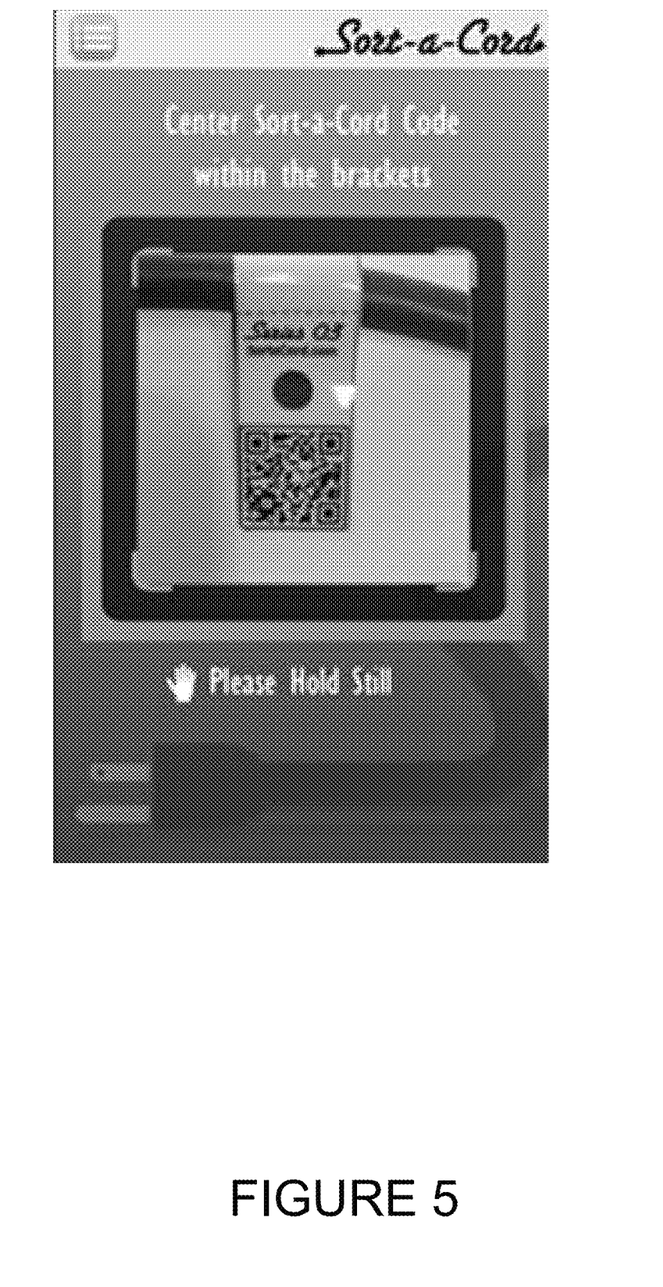
FIGS. 5-7 shows exemplary screens from a mobile application of the present invention.
Figure 6:
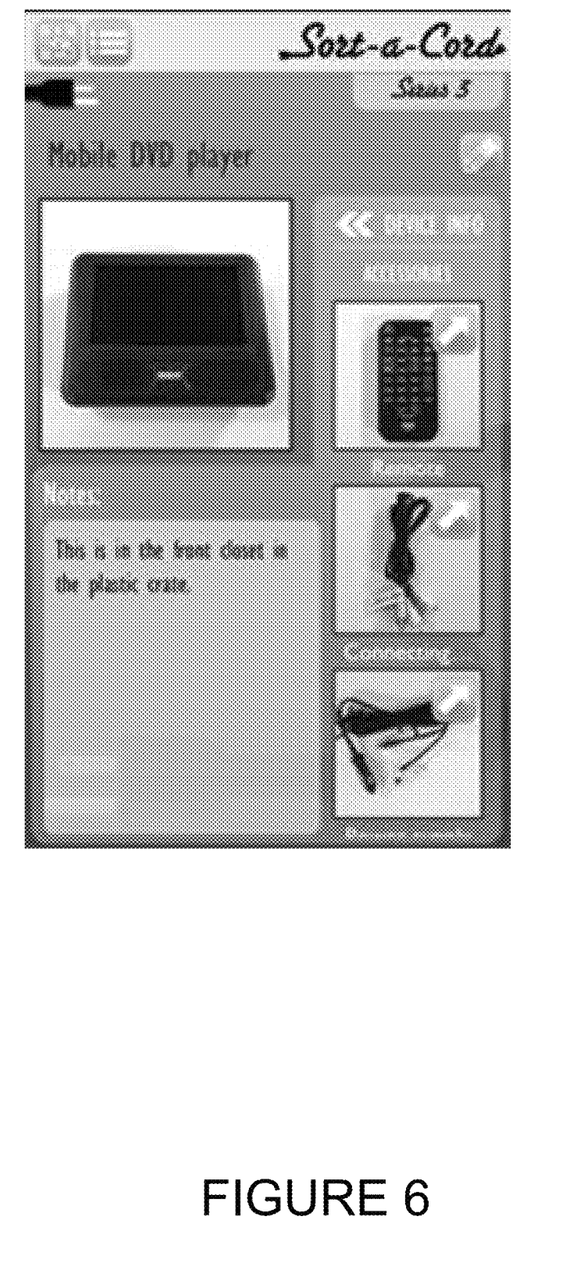

Upon choosing the scan option, the user is presented the scan device screen 150, as seen in FIG. 5, which the user uses to scan the coded sticker on the device, and then subsequently entering device information 152. Upon saving the device information to create the device record, the user may then proceed from the device record screen 162, as seen in FIG. 6, to scan accessories 170 for that particular device. The user then enters accessory information 172, which is saved to the accessory record and may be viewed on the accessory record screen 174.

Figure 7:
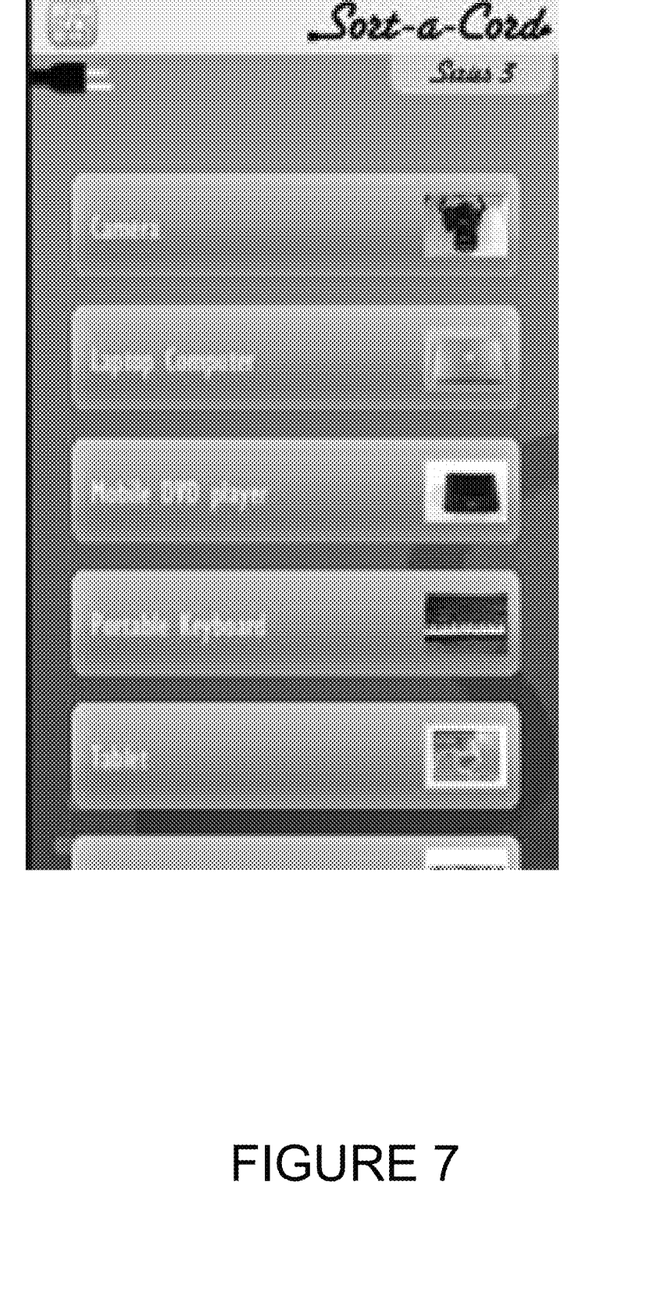

Upon choosing the device list, the user is presented with a list of devices in the system 160, as seen in FIG. 7. The user may edit the list, or can select a particular device (such as by swiping or touching the name of the device on the screen), which opens the device record screen 162. From here, the user may add accessories (i.e., through scanning), or may select an accessory already in the system, and view the accessory record screen 174.

Upon choosing the identify option (i.e., to identify which device a particular accessory is associated with), the user is prompted to scan 180 the coded sticker on the accessory (or device). The system then consults the user's records, and takes the user to the appropriate accessory record or device record screens.

Figure 8:
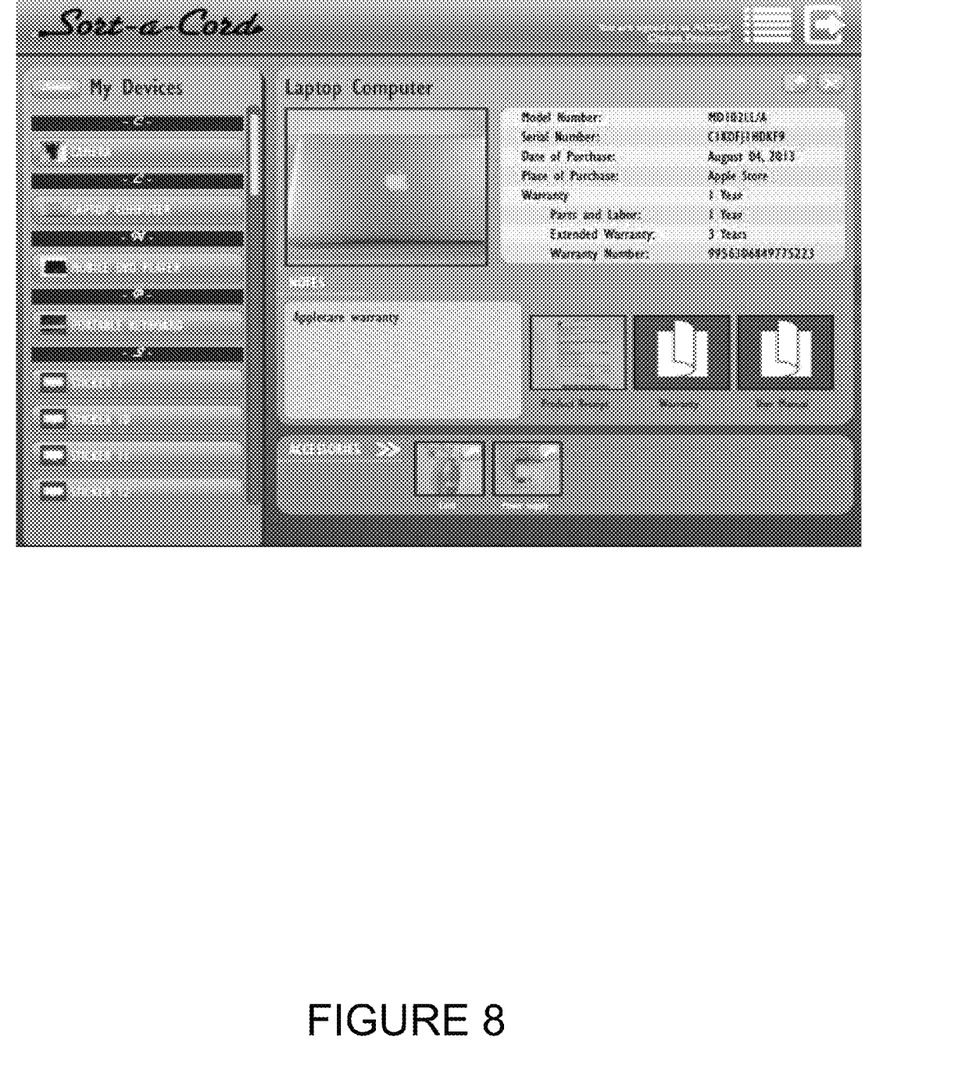
FIG. 8 shows an exemplary screen from a Web browser application of the present invention.

The system can also be operated or accessed through a Web browser application running on a personal computer, as seen in FIG. 8.

While the above embodiments of the invention have been described in the context of an electric device and accessory devices or items, the present invention can be used in a variety of other contexts.

In order to provide a context for the various aspects of the invention, the following discussion provides a brief, general description of a suitable computing environment in which the various aspects of the present invention may be implemented. A computing system environment is one example of a suitable computing environment, but is not intended to suggest any limitation as to the scope of use or functionality of the invention. A computing environment may contain any one or combination of components discussed below, and may contain additional components, or some of the illustrated components may be absent. Various embodiments of the invention are operational with numerous general purpose or special purpose computing systems, environments or configurations. Examples of computing systems, environments, or configurations that may be suitable for use with various embodiments of the invention include, but are not limited to, personal computers, laptop computers, computer servers, computer notebooks, hand-held devices, microprocessor-based systems, multiprocessor systems, TV set-top boxes and devices, programmable consumer electronics, cell phones, personal digital assistants (PDAs), network PCs, minicomputers, mainframe computers, embedded systems, distributed computing environments, and the like.

Embodiments of the invention may be implemented in the form of computer-executable instructions, such as program code or program modules, being executed by a computer or computing device. Program code or modules may include programs, objections, components, data elements and structures, routines, subroutines, functions and the like. These are used to perform or implement particular tasks or functions. Embodiments of the invention also may be implemented in distributed computing environments. In such environments, tasks are performed by remote processing devices linked via a communications network or other data transmission medium, and data and program code or modules may be located in both local and remote computer storage media including memory storage devices.

In one embodiment, a computer system comprises multiple client devices in communication with at least one server device through or over a network. In various embodiments, the network may comprise the Internet, an intranet, Wide Area Network (WAN), or Local Area Network (LAN). It should be noted that many of the methods of the present invention are operable within a single computing device.

A client device may be any type of processor-based platform that is connected to a network and that interacts with one or more application programs. The client devices each comprise a computer-readable medium in the form of volatile and/or nonvolatile memory such as read only memory (ROM) and random access memory (RAM) in communication with a processor. The processor executes computer-executable program instructions stored in memory. Examples of such processors include, but are not limited to, microprocessors, ASICs, and the like.

Client devices may further comprise computer-readable media in communication with the processor, said media storing program code, modules and instructions that, when executed by the processor, cause the processor to execute the program and perform the steps described herein. Computer readable media can be any available media that can be accessed by computer or computing device and includes both volatile and nonvolatile media, and removable and non-removable media. Computer-readable media may further comprise computer storage media and communication media. Computer storage media comprises media for storage of information, such as computer readable instructions, data, data structures, or program code or modules. Examples of computer-readable media include, but are not limited to, any electronic, optical, magnetic, or other storage or transmission device, a floppy disk, hard disk drive, CD-ROM, DVD, magnetic disk, memory chip, ROM, RAM, EEPROM, flash memory or other memory technology, an ASIC, a configured processor, CDROM, DVD or other optical disk storage, magnetic cassettes, magnetic tape, magnetic disk storage or other magnetic storage devices, or any other medium from which a computer processor can read instructions or that can store desired information. Communication media comprises media that may transmit or carry instructions to a computer, including, but not limited to, a router, private or public network, wired network, direct wired connection, wireless network, other wireless media (such as acoustic, RF, infrared, or the like) or other transmission device or channel. This may include computer readable instructions, data structures, program modules or other data in a modulated data signal such as a carrier wave or other transport mechanism. Said transmission may be wired, wireless, or both. Combinations of any of the above should also be included within the scope of computer readable media. The instructions may comprise code from any computer-programming language, including, for example, C, C++, C#, Visual Basic, Java, and the like.

Components of a general purpose client or computing device may further include a system bus that connects various system components, including the memory and processor. A system bus may be any of several types of bus structures, including, but not limited to, a memory bus or memory controller, a peripheral bus, and a local bus using any of a variety of bus architectures. Such architectures include, but are not limited to, Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing and client devices also may include a basic input/output system (BIOS), which contains the basic routines that help to transfer information between elements within a computer, such as during start-up. BIOS typically is stored in ROM. In contrast, RAM typically contains data or program code or modules that are accessible to or presently being operated on by processor, such as, but not limited to, the operating system, application program, and data.

Client devices also may comprise a variety of other internal or external components, such as a monitor or display, a keyboard, a mouse, a trackball, a pointing device, touch pad, microphone, joystick, satellite dish, scanner, a disk drive, a CD-ROM or DVD drive, or other input or output devices. These and other devices are typically connected to the processor through a user input interface coupled to the system bus, but may be connected by other interface and bus structures, such as a parallel port, serial port, game port or a universal serial bus (USB). A monitor or other type of display device is typically connected to the system bus via a video interface. In addition to the monitor, client devices may also include other peripheral output devices such as speakers and printer, which may be connected through an output peripheral interface.

Client devices may operate on any operating system capable of supporting an application of the type disclosed herein. Client devices also may support a browser or browser-enabled application. Examples of client devices include, but are not limited to, personal computers, laptop computers, personal digital assistants, computer notebooks, hand-held devices, cellular phones, mobile phones, smart phones, pagers, digital tablets, Internet appliances, and other processor-based devices. Users may communicate with each other, and with other systems, networks, and devices, over the network through the respective client devices.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A system for tracking electronic devices and accessories, comprising:
   a plurality of coded stickers adapted to be affixed to an electronic device or an accessory to said electronic device, each of said stickers comprising a scannable code; and
   a processor or microprocessor coupled to a memory, wherein the processor or microprocessor is programmed to track said electronic device and accessories by:
   receiving scanned code information from a scanned coded sticker affixed to said electronic device or accessory from an input device;
   receiving identification data for said electronic device or accessory; and
   storing said scannable code information and identification data on a computer storage medium;
   wherein said scannable codes are not pre-associated with a particular electronic device or accessory.

2. The system of claim 1, wherein the input device is a hand-held computing device.

3. The system of claim 1, wherein the input device is a mobile computing device or smart phone.

4. The system of claim 1, wherein the scannable code is a QR code.

5. The system of claim 1, wherein said accessory comprises a power cord, connection cord, cable, or remote control device.

6. The system of claim 1, wherein the processor or microprocessor is programmed to identify an unknown device or accessory tagged with a coded sticker, whose information is already stored in the system, by:
- receiving scanned code information from the coded sticker affixed to said unknown device or accessory from a second input device;
- identifying the stored identification data corresponding to the scanned code information; and
- providing the stored identification data to the second input device.

7. A method for tracking electronic devices and accessories, comprising the steps of:
- providing a plurality of coded stickers adapted to be affixed to an electronic device or an accessory to said electronic device, each of said stickers comprising a scannable code;
- receiving scanned code information from a scanned coded sticker affixed to said electronic device or accessory from an input device;
- receiving identification data for said electronic device or accessory; and
- storing said scannable code information and identification data on a computer storage medium;
- wherein said scannable codes are not pre-associated with a particular electronic device or accessory.

8. The method of claim 7, further comprising the steps of:
identifying an unknown device or accessory by
- receiving scanned code information from the coded sticker affixed to said unknown device or accessory from a second input device;
- identifying the stored identification data corresponding to the scanned code information; and
- providing the stored identification data to the second input device.

9. The method of claim 7, wherein the input device is a hand-held computing device.

10. The method of claim 7, wherein the input device is a mobile computing device or smart phone.

11. The method of claim 7, wherein the scannable code is a QR code.

12. The system of claim 7, wherein said accessory comprises a power cord, connection cord, cable, or remote control device.

13. A method for tracking electronic devices and accessories, comprising the steps of:
- affixing a first coded sticker with a scannable code to an electronic device;
- scanning the first coded sticker with an input device;
- entering identification data for said electronic device into said input device into a data record for said device;
- affixing a second coded sticker with a scannable code to an accessory for said electronic device;
- scanning the second coded sticker with an input device; and
- entering identification data for said accessory into said input device into an accessory data record associated with the data record for said device;
- wherein said scannable codes are not pre-associated with a particular electronic device or accessory.

* * * * *